Oct. 25, 1932.  I. D. PERRY  1,884,837
DOOR BUMPER AND THE LIKE
Filed Oct. 28, 1931
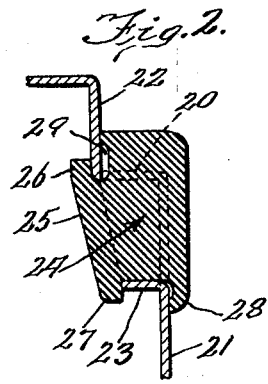
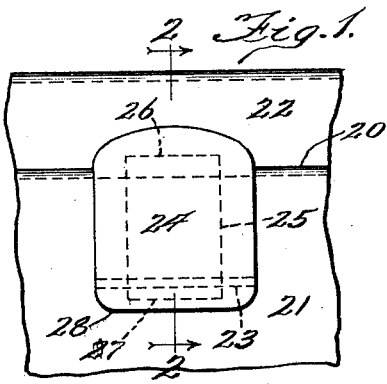
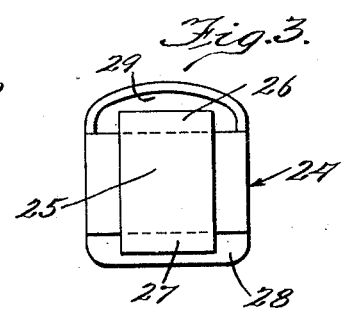
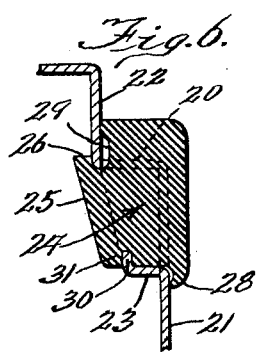
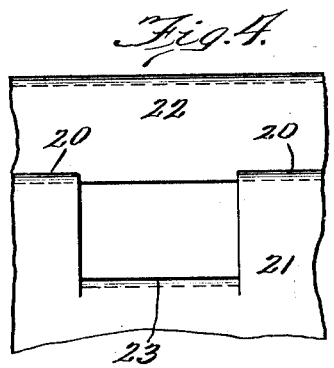
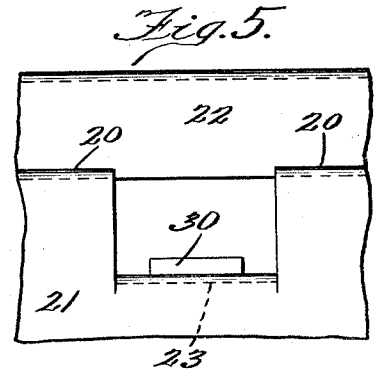
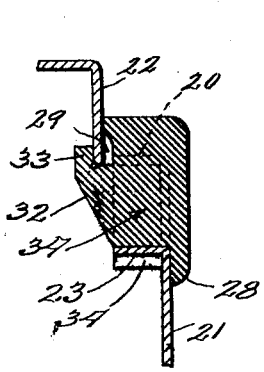
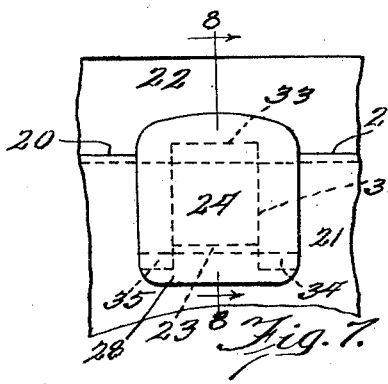
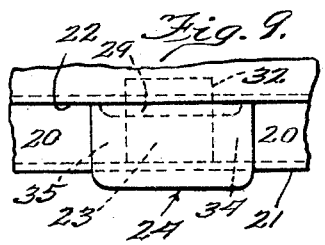
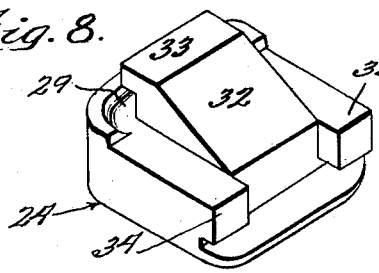
Inventor:
Ira D. Perry Patented Oct. 25, 1932

1,884,837

UNITED STATES PATENT OFFICE

IRA D. PERRY, OF CHICAGO, ILLINOIS, ASSIGNOR TO EDNA L. MEYER, OF ROCKFORD, ILLINOIS

DOOR BUMPER AND THE LIKE

Application filed October 28, 1931. Serial No. 571,574.

This invention has to do with improvements in door bumpers and the like. The door bumpers herein disclosed are especially intended for use in connection with the doors of automobiles, but it will appear that they may also be used in connection with other doors in some instances. Inasmuch, however, as the devices herein disclosed have been designed especially with a view to meeting conditions in connection with automobile door construction and operation, I have illustrated and will describe particularly such application of the invention.

As a general rule the door frame of the automobile is so constructed as to provide a ledge facing in the direction of door closing movement and also a flange extending inwardly therefrom and parallel to the direction of door closing movement. The edge portion of the door itself is provided with a companion ledge facing in the direction of door closing movement and which approaches and seats against or towards the ledge of the door frame as the door is closed.

Generally also, in those cases in which the automobile bodies are provided with two doors on one side thereof, the door body is provided with a door stanchion or pillar located between the closing edges of the two doors and which door stanchion or pillar receives the edges of the two doors when closed.

The main object of the present invention is to provide a sheet metal door pillar construction which is so formed as to establish a recess or socket at the position of the ledge and the inwardly extending flange, which socket receives the bumper block and retains the same in place. In this connection it is an object to provide a construction in which the sheet metal of the door stanchion or pillar is so formed as to provide said recess or socket including the floor thereof constituting an integral portion of the sheet metal of the inwardly extending flange aforesaid, the back portion of said socket being provided with an opening to receive a lug or projection on the body portion of the bumper block itself and cause said projection to engage with the back side of the door pillar in such manner as to effectively lock the bumper block.

Other objects and uses of the invention will appear from a detailed description of the same which consists in the features of construction and combinations of parts hereinafter described and claimed.

In the drawing:

Figure 1 shows a fragmentary face view of a short section of a sheet metal door pillar embodying the features of the present invention and having the bumper block seated within the recess or socket thereof;

Figure 2 shows a cross section on the line 2—2 of Figure 1 looking in the direction of the arrows;

Figure 3 shows a back face view of the bumper block removed from the door pillar;

Figure 4 shows a view corresponding to Figure 1 but with the bumper block removed from the door pillar;

Figure 5 shows a view similar to that of Figure 4 but illustrating a modified type of construction;

Figure 6 shows a view similar to Figure 2 but corresponding to the arrangement of Figure 5;

Figure 7 shows a view similar to Figure 1 but illustrating still another modified type of construction;

Figure 8 shows a cross section on the line 8—8 of Figure 7 looking in the direction of the arrows;

Figure 9 shows a plan view corresponding to Figures 7 and 8; and

Figure 10 shows a back perspective view of the bumper block itself removed from the door pillar.

This application is a continuation in part of my copending application, Serial No. 546,552, filed June 24, 1931.

In the different constructions herein illustrated the sheet metal of the door pillar is suitably treated to provide a ledge 20 facing in the direction of door closing movement together with an inwardly extending flange 21 which lies parallel to the direction of door closing movement and connects to the edge of the ledge 20. In some cases the door pillar is also provided with an outwardly extending flange 22 lying parallel to the direction of door closing movement and connected to the other edge of the ledge.

In the present case the sheet metal of the door pillar is so treated as to provide a socket or recess which reaches downwardly from the position of the ledge 20 and backwardly from the position of the flange 21; and this socket or recess is open at its back and ends as is clearly evident from comparison of the different figures. Furthermore the sheet metal of the inwardly extending flange 21 is so treated as to provide a backwardly reaching lug or lip 23 which establishes a floor for the socket or recess for the purpose of supporting the bumper block in place and enabling it to resist the forces of pressure and impact incident to the door closing movement.

The bumper block 24 is made of suitable resilient material such as rubber or the like. It includes a body portion of proper size to seat down into the socket or recess and be directly supported by the floor 23 thereof; and said bumper block is of such size that it will project somewhat above the position of the ledge 20 in order to establish a door contacting portion.

In the construction illustrated in Figures 1, 2, 3, and 4 the bumper block 24 is provided with a backwardly extending lug portion 25 which is of such width that it can be seated through the opening at the back of the socket or recess, said lug 25 also being provided with upper and lower hook ends 26 and 27 respectively which hook behind the flange 22 and the floor 23 of the door pillar respectively when the bumper block is forced into place. These lugs will thus serve to lock the bumper block in place and prevent accidental removal thereof from the door pillar.

In some cases it will be desirable to provide the body of the bumper block with a downwardly depending lip or skirt 28 which will project somewhat below the edge of the socket or recess so as to cover over the same and give the device a more finished appearance. It will also generally be desirable to relieve the back face of the upper portion of the bumper block as shown at 29 so as to ensure a more satisfactory contacting of the edge portion of the back of the bumper block against the flange 22.

The construction shown in Figures 5 and 6 is similar to that of Figures 1, 2, 3, and 4; but in the present case the lug 23 has its rear edge upturned as shown at 30 in order to provide a hook which may be engaged by the lug 31 on the lower end of the back portion of the bumper block. For this purpose the back portion of the bumper block may be slightly recessed if necessary in order to receive said lug 30.

The construction shown in Figures 7 and 8, 9, and 10 is similar to that already described, and in fact the door pillar construction of Figures 7, 8, 9, and 10 is the same as the door pillar construction of Figures 1, 2, 3, and 4. In the present case, however, the bumper block 24 has a backwardly extending lug 32 the upper end 33 of which is hooked upwardly similar to the hooked lug 26 of Figures 2 and 6 and is adapted to engage behind the flange 22 in order to lock the upper end of the bumper block in place.

In the present case, however, the lug 27, (or 31), at the lower end of the back of the bumper block is eliminated; and in place thereof there are provided the downwardly extending lugs 34 and 35 which are separated from each other a distance such that they may project downwardly at the sides of the floor 23 of the socket, said lugs 34 and 35 engaging the back face of the inwardly extending flange 21 of the door pillar in order to lock the lower portion of the bumper block in place.

The pumper block or Figures 7, 8, 9, and 10 may be readily seated into place within the socket of the door pillar, much more conveniently in fact than some of the other constructions referred to.

While I have herein shown and described certain embodiments of the features of my present invention still I do not intend to limit myself thereto except as I may do so in the claims.

I claim:

1. In a device of the class described the combination of a sheet metal door pillar suitably formed to provide a ledge facing in the direction of door closing movement together with an inwardly extending flange integral with the edge of said ledge, said door pillar being provided with a socket reaching inwardly from the ledge and the inwardly extending flange, the metal of the inwardly extending flange at the position of the socket being suitably formed to provide an inwardly extending lug constituting the floor of the socket, the back of the socket being open, together with a bumper block of resilient material having a body portion located within said socket and seated upon said lug floor, the body portion extending through the open back of said socket and being provided with lugs engaging the back face of the door pillar adjacent to the upper portion of socket and also engaging the rear edge of the lug floor respectively to thereby retain the bumper block in place.

2. In a device of the class described the combination of a sheet metal door pillar comprising a sheet of metal suitably formed to provide a ledge facing in the direction of door closing movement and also to provide an inwardly extending flange integrally connected to the edge of said ledge, the sheet metal of said door pillar being suitably formed to provide a socket reaching inwardly from the ledge and from the inwardly extending flange, a lug reaching rearwardly from the inwardly extending flange at the lower end of the socket and constituting a floor for the socket, the back of the socket being open, and a bumper block of resilient material located within the socket and seated upon said lug floor and provided with a rearwardly extending portion reaching through said opening and engaging the back sides of the door pillar at the upper and lower edges of said opening to thereby retain the bumper block in place.

3. In a device of the class described the combination of a sheet metal door pillar comprising a sheet of metal suitably formed to provide a ledge facing in the direction of door closing movement and also to provide an inwardly extending flange integrally connected to the edge of said ledge, the sheet metal of said door pillar being suitably formed to provide a socket reaching inwardly from the ledge and from the inwardly extending flange, a lug reaching rearwardly from the inwardly extending flange at the lower end of the socket and constituting a floor for the socket, the back of the socket being open, and a bumper block of resilient material located within the socket and seated upon said lug floor and provided with downwardly extending lugs engaging the ends of the lug floor and the back face of the inwardly extending flange, the bumper block being provided with means for engaging the back portion of the door pillar at the upper edge of the socket to thereby retain the bumper block in place.

4. In a device of the class described, the combination of a sheet metal door pillar suitably formed to provide a ledge facing in the direction of door closing movement and an inwardly extending flange connected with the edge of said ledge and disposed substantially parallel with the direction of door closing movement, the sheet metal of said pillar being suitably formed to provide a socket reaching inwardly from the ledge portion and the flange portion, the sheet metal of the one portion being suitably formed to provide the floor of the socket, the rest of the socket being open for communication inside the pillar, and a bumper block of resilient material fitting in and projecting from the socket and seated upon the floor on the one portion of said pillar and being formed to provide a projection for engagement with the inside of the other portion of the pillar by extension from the socket within the pillar, whereby to retain the bumper block in place in the socket.

5. In a device of the class described, the combination of a sheet metal door pillar suitably formed to provide a ledge facing in the direction of door closing movement and an inwardly extending flange connected with the edge of said ledge and disposed substantially parallel with the direction of door closing movement, the sheet metal of the pillar being suitably formed to provide a socket reaching inwardly from the ledge and the inwardly extending flange, the sheet metal of the flange being formed to provide an inwardly extending portion constituting the floor of the socket, the back of the socket being open for communication inside the pillar, and a bumper block of resilient material fitting in and projecting from the socket and seated on said floor, said bumper block being formed to provide a portion extending through the open back of the socket for engagement with the inside of the pillar to retain the bumper block in place.

6. In a device of the class described, the combination of a sheet metal door pillar suitably formed to provide a ledge facing in the direction of door closing movement and an inwardly extending flange connected with the edge of said ledge and disposed substantially parallel with the direction of door closing movement, the sheet metal of the pillar being suitably formed to provide a socket reaching inwardly from the ledge and the inwardly extending flange, the sheet metal of the flange being formed to provide an inwardly extending portion constituting the floor of the socket, the back of the socket being open for communication inside the pillar, and a bumper block of resilient material fitting in and projecting from the socket and seated on said floor, said bumper block being formed to provide an upwardly projecting portion extending through the open back of the socket for engagement with the inside of the pillar to retain the bumper block in place, and a downwardly projecting portion for engagement with the inside of the pillar adjacent the floor of the socket to further retain the bumper block in place.

7. In a device of the class described, the combination of a sheet metal door pillar suitably formed to provide a ledge facing in the direction of door closing movement, the sheet metal of the pillar being suitably formed to provide a socket reaching inwardly from the ledge and the inwardly extending flange, the sheet metal of the flange being formed to provide an inwardly extending portion constituting the floor of the socket, the back of the socket being open for communication inside the pillar, and a bumper block of resilient material fitting in and projecting from the socket and seated on said floor, said bumper block being formed to provide a portion extending through the open back of the socket at the upper end thereof for engagement with the inside of the pillar adjacent the ledge, whereby to retain the bumper block in place in the socket, said bumper block fitting on the floor of the socket so as to be further held in place in the socket at the lower portion thereof.

IRA D. PERRY.